(12) United States Patent
Cho et al.

(10) Patent No.: US 10,231,169 B2
(45) Date of Patent: Mar. 12, 2019

(54) METHOD AND DEVICE FOR MANAGING ACCESS OF CONNECTED TERMINALS

(71) Applicant: Samsung Electronics Co., Ltd, Gyeonggi-do (KR)

(72) Inventors: Songyean Cho, Seoul (KR); Sung Hwan Won, Gyeonggi-do (KR); Sangsoo Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/901,484

(22) PCT Filed: Jun. 30, 2014

(86) PCT No.: PCT/KR2014/005824
§ 371 (c)(1),
(2) Date: Dec. 28, 2015

(87) PCT Pub. No.: WO2014/209088
PCT Pub. Date: Dec. 31, 2014

(65) Prior Publication Data
US 2016/0374005 A1    Dec. 22, 2016

(30) Foreign Application Priority Data
Jun. 28, 2013  (KR) .......................... 10-2013-0075517

(51) Int. Cl.
*H04W 48/06*     (2009.01)
*H04L 29/06*     (2006.01)
(Continued)

(52) U.S. Cl.
CPC .......... *H04W 48/06* (2013.01); *H04L 65/105* (2013.01); *H04L 65/1016* (2013.01); *H04W 8/02* (2013.01); *H04W 88/08* (2013.01)

(58) Field of Classification Search
None
See application file for complete search history.

(56) References Cited

U.S. PATENT DOCUMENTS

2008/0285543 A1 * 11/2008 Qiu ..................... H04L 65/1069
370/352
2010/0172241 A1    7/2010 Patel
(Continued)

FOREIGN PATENT DOCUMENTS

WO    WO 2011/136589 A2    11/2011
WO    WO 2011/139098 A2    11/2011
WO    WO 2012/020958 A2    2/2012

OTHER PUBLICATIONS

International Search Report dated Oct. 23, 2014 in connection with International Patent Application No. PCT/KR2014/005824, 5 pages.
(Continued)

*Primary Examiner* — Saba Tsegaye

(57) ABSTRACT

The present invention relates to a method and a device for barring access of terminals connected to a base station. A communication method of an Internet protocol multimedia service (IMS) entity, according to one embodiment of the present invention, comprises the steps of: receiving a service request message from a terminal; determining whether to allow an access of a service according to a load status of the IMS and the service requested from the terminal; and transmitting, to the terminal, a connection barring message which includes information for indicating that the access of the terminal is barred, when it is determined to bar the access of the service. According to the one embodiment of the present invention, the IMS can be prevented from being congested due to loads concentrated on IMS entities such as a P-CSCF and the like, and can prevent a situation in which an emergency call or a priority call of a person from a police station or a fire station or the like cannot be received.

6 Claims, 13 Drawing Sheets

(51) Int. Cl.
*H04W 8/02* (2009.01)
*H04W 88/08* (2009.01)

(56) References Cited

U.S. PATENT DOCUMENTS

| | | |
|---|---|---|
| 2010/0246381 A1 | 9/2010 | Alcina et al. |
| 2013/0044594 A1 | 2/2013 | Kim et al. |
| 2013/0046971 A1* | 2/2013 | Lu ..................... H04L 65/1016 |
| | | 713/155 |
| 2013/0051228 A1 | 2/2013 | Kim et al. |
| 2013/0122906 A1 | 5/2013 | Klatt |
| 2013/0136096 A1 | 5/2013 | Lee et al. |
| 2013/0232555 A1* | 9/2013 | Zhang .................. H04W 12/08 |
| | | 726/4 |
| 2013/0272253 A1* | 10/2013 | Veenstra ........... H04W 72/0486 |
| | | 370/329 |
| 2014/0003337 A1* | 1/2014 | Majmundar .......... H04W 48/06 |
| | | 370/328 |
| 2014/0269279 A1* | 9/2014 | Ismail ............... H04W 28/0289 |
| | | 370/230 |
| 2014/0293964 A1* | 10/2014 | Park ....................... H04W 8/04 |
| | | 370/331 |
| 2016/0057652 A1* | 2/2016 | Chandramouli .. H04W 28/0289 |
| | | 370/235 |

OTHER PUBLICATIONS

Written Opinion of International Searching Authority dated Oct. 23, 2014 in connection with International Patent Application No. PCT/KR2014/005824, 5 pages.

\* cited by examiner

METHOD AND DEVICE FOR MANAGING ACCESS OF CONNECTED TERMINALS

CROSS-REFERENCE TO RELATED APPLICATION

The present application claims priority under 35 U.S.C. 365 to International Patent Application No. PCT/KR2014/005824 filed Jun. 30, 2014, entitled "METHOD AND DEVICE FOR MANAGING ACCESS OF CONNECTED TERMINALS", and through Korean Patent Application No. 10-2013-0075517, which was filed on Jun. 28, 2013, both of which are incorporated herein by reference into the present disclosure as if fully set forth herein.

TECHNICAL FIELD

The present invention relates to a method and device for barring access of terminals connected to a base station (eNB).

BACKGROUND ART

Most of the user equipment (UE) devices, e.g., smartphones, operate in connected mode for most of the operating time due to frequent use of data.

FIG. 1 is a diagram showing an example of a case where INVITE messages are transmitted from a number of conventional UE devices in connected mode.

Referring to FIG. 1, when a number of UE devices 110 are in connected mode, they may simultaneously transmit an INVITE message to initiate a Voice over Long Term Evolution (VoLTE) call, although the message is small in terms of data amount. That is, when a number of UE devices 110 all transmit an INVITE message, a number of invite message are gathered simultaneously due to a Proxy-Call Session Control Function (P-CSCF) and Internet Protocol Multimedia Service (IMS) 120 may be inoperative. In particular, when it is assumed that all users or UE devices 110, registered on P-CSCF, initiate a call simultaneously, increasing the capacity of P-CSCF causes cost issues. To resolve this, the capacity of P-CSCF and IMS entities is supported, so that calls corresponding to a certain percentage of users 110 that have registered their calls simultaneously can be simultaneously made. In this state, a particular situation where invite messages are simultaneously created from a number of UE devices as shown in FIG. 1 may occur, e.g., increase in calls due to a natural disaster, increase in calls due to a particular sports event, etc. This may result in an increase load upon IMS entities 120 such as P-CSCF, etc.; therefore, rendering the IMS inoperative and also causing situations in which an emergency call cannot be processed or a high priority call cannot be processed by a person on duty at a police station or a fire station.

DISCLOSURE OF INVENTION

Technical Problem

The present invention has been made in view of the above problems, and provides a system which prevents, when load upon IMS entities such as P-CSCF, etc. is increased, the paralyzation of IMS, and the occurrence of situations in which an emergency call cannot be processed or a high priority call cannot be processed by a person on duty at a police station or a fire station.

The present invention further provides a method of controlling access of UE in connected mode.

It should be understood that the objectives of the present invention are not limited to those in the foregoing description, and the other objectives not described above will become more apparent from the following description.

Solution to Problem

In accordance with an embodiment of the present invention, the present invention provides a communication method of a Mobility Management Entity (MME) including: receiving, from an Internet Protocol Multimedia Service (IMS) entity, the IMS entity load information; and transmitting, to an eNB (base station), barring information related to IMS for user equipment (UE) devices (terminals) connected to the eNB, by using the received IMS entity load information.

Preferably, the transmission of IMS-related barring information includes: selecting UE devices in a state not using allowed services, based on Allocation and Retention Priority (ARP) or QoS Class Identifier (QCI); and transmitting, to the eNB, a UE context release command including UE information regarding the selected UE devices.

Preferably, the transmission of IMS-related barring information includes: selecting bearer parameters related to allowed IMS services, by using the received, IMS entity load information; and transmitting the selected bearer parameters to the eNB.

Preferably, the IMS entity load information may include at least one of the following: a load level indicating the degree of load upon an IMS entity, a service category indicating information regarding which services are allowably accessible, and Access Point Name (APN).

In accordance with another embodiment of the present invention, the present invention provides a communication method of a base station (eNB) including: receiving, from a Mobility Management Entity (MME), information regarding Internet Protocol Multimedia Service (IMS) related Barring for UE devices connected to the eNB; and releasing connection of connected UE devices by the received IMS-related barring information;

Preferably, the IMS-related barring information includes: a UE context release command including UE information regarding UE devices in a state not using allowed services, based on Allocation and Retention Priority (ARP) or QoS Class Identifier (QCI). The release of connection of connected UE devices includes releasing connection of connected UE devices by using the UE information included in the UE context release command.

Preferably, the IMS-related barring information includes bearer parameters related to allowed IMS services. The release of connection of connected UE devices includes: determining whether there is UE that does not have the bearer parameters within the eNB; and releasing, when there is UE that does not have the bearer parameters, connection of the UE that does not have the bearer parameters.

In accordance with another embodiment of the present invention, the present invention provides a communication method of a terminal including: receiving, from an Internet Protocol Multimedia Service (IMS) entity, the IMS entity load information; and stopping transmitting a message for requesting IMS services for a pre-set period of time, by using the IMS entity load information.

Preferably, the IMS entity load information may include a backoff period of time during which the UE stops transmitting the message for requesting IMS services.

In accordance with another embodiment of the present invention, the present invention provides a communication method of an Internet Protocol Multimedia Service (IMS) entity including: receiving a service request message for requesting services from a terminal; determining whether to allow the terminal to access the services, according to the services requested by the terminal and the load status of the IMS entity; and when barring the terminal from accessing the services, transmitting, to the terminal, an access barring message including information indicating that access of the terminal is barred.

Preferably, the access baring message may include: a backoff period of time during which the terminal stops transmission of the service request message.

Preferably, the access barring message may include: information regarding the overload status of the IMS entity.

Preferably, the determination as to whether to allow the terminal to access the services may include: determining, when the load upon the IMS entity is greater than or equal to a certain level, whether to allow the terminal to access the services.

In accordance with another embodiment of the present invention, the present invention provides a communication method of a terminal including: transmitting a service request message for requesting services to an Internet Protocol Multimedia Service (IMS) entity; and receiving, from the IMS entity, an access barring message including information indicating that access of the terminal is barred, according to the services requested by the terminal and the load status of the IMS entity.

Preferably, the communication method of a terminal may further include: stopping transmission of the service request message for a pre-set period of time according to the access barring message.

In accordance with another embodiment of the present invention, the present invention provides an Internet Protocol Multimedia Service (IMS) entity including: a communication unit for communicating with a terminal; and a controller for: receiving a service request message for requesting services from the terminal; determining whether to allow the terminal to access the services, according to the services requested by the terminal and the load status of the IMS entity; and transmitting, to the terminal, when barring the terminal from accessing the services, an access barring message including information indicating that access of the terminal is barred.

In accordance with another embodiment of the present invention, the present invention provides a terminal including: a communication unit for communicating with an Internet Protocol Multimedia Service (IMS) entity; and a controller for: transmitting a service request message for requesting services to the IMS entity; and receiving, from the IMS entity, an access barring message including information indicating that access of the terminal is barred, according to the services requested by the terminal and the load status of the IMS entity.

Advantageous Effects of Invention

According to the present invention, the method for blocking access of terminals connected to a base station (eNB) is capable of preventing: when load upon IMS entities such as P-CSCF, etc. is increased, the paralyzation of IMS, and the occurrence of situations in which an emergency call cannot be processed or a high priority call cannot be processed by a person on duty at a police station or a fire station.

It should be understood that the features and advantages of the present invention are not limited to those in the foregoing description, and the other features and advantages not described above will become more apparent from the following description.

MODE FOR THE INVENTION

Detailed descriptions of well-known functions and structures incorporated herein may be omitted to avoid obscuring the subject matter of the present invention. Embodiments of the present invention are described in detail with reference to the accompanying drawings. The terms or words described in the description and the claims should not be limited by a general or lexical meaning, instead should be analyzed as a meaning and a concept through which the inventor defines and describes the invention at his most effort, to comply with the idea of the invention.

Figure 1:
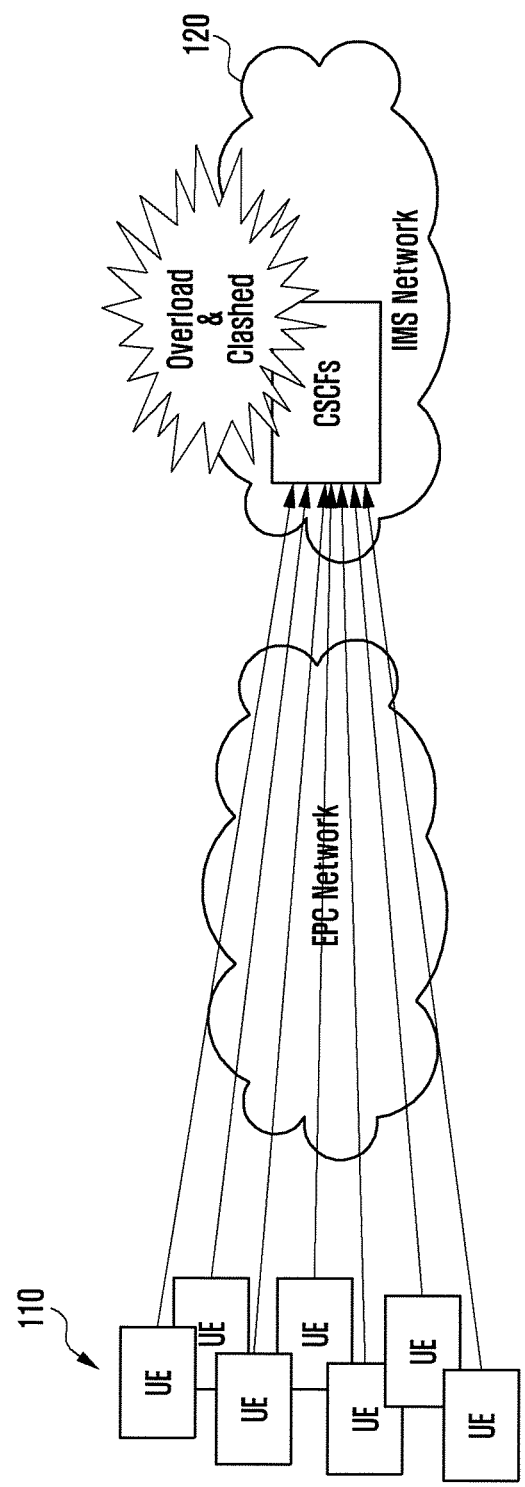
FIG. 1 is a diagram showing an example of a case where INVITE messages are transmitted from a number of conventional UE devices in connected mode.
Figure 2:
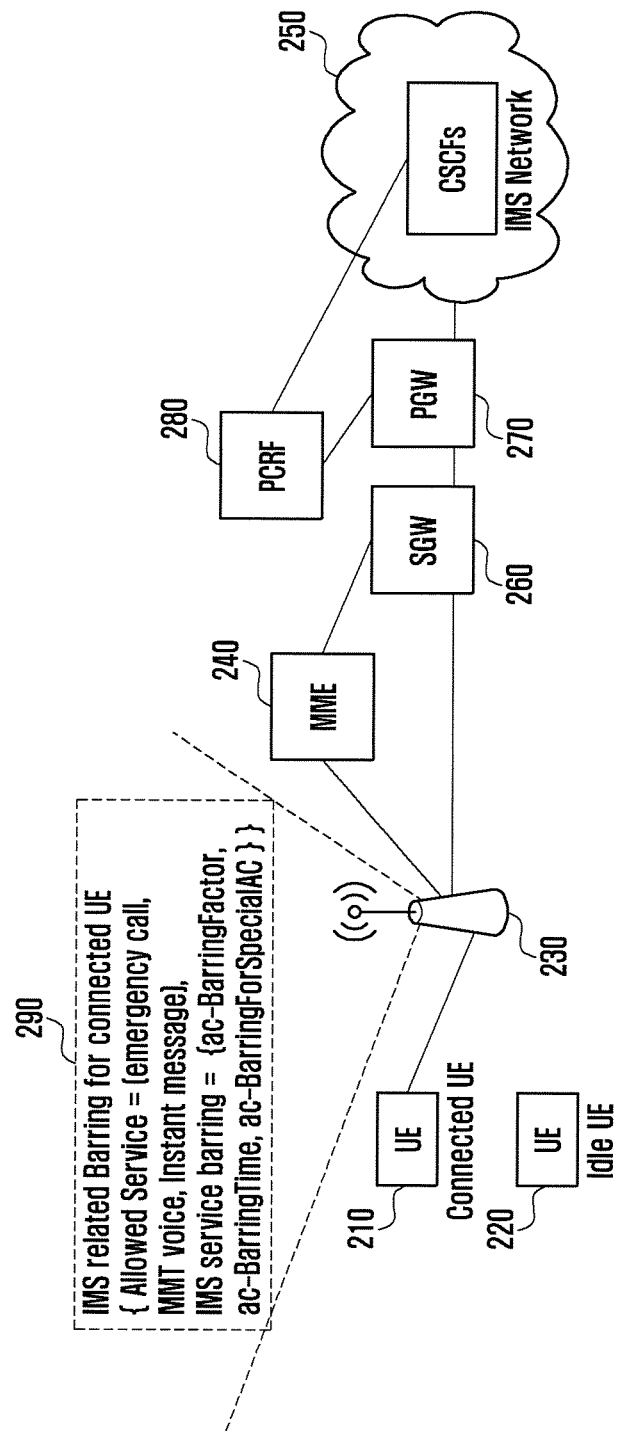
FIG. 2 is a diagram illustrating a method of barring UE in connected mode according to a first embodiment of the present invention and FIG. 3 is a flow diagram describing a method of barring UE in connected mode according to a first embodiment of the present invention.
Figure 3:
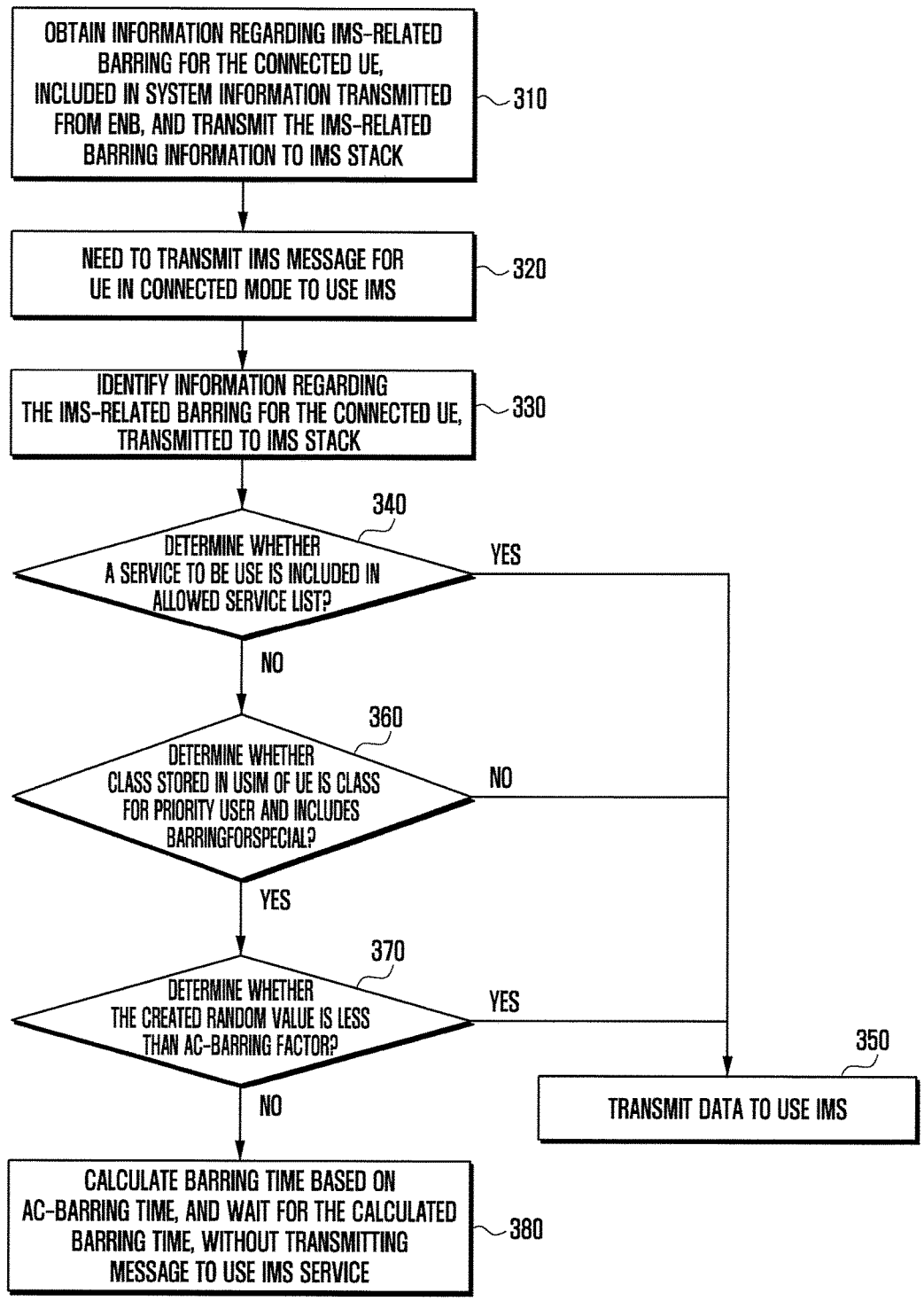

FIG. 2 is a diagram illustrating a method of barring UE in connected mode according to a first embodiment of the present invention and FIG. 3 is a flow diagram describing a method of barring UE in connected mode according to a first embodiment of the present invention.

Referring to FIG. 2, when entities of Internet Protocol Multimedia Service (IMS) network are overloaded, they need to be capable of barring a request message, INVITE, from UE in order to make a call connection, except for a message related to an emergency call or priority call. Entities also need to capable of barring messages to use IMS services (e.g., instant messages), if the messages are not a message related to an emergency call or priority call. Entities further need the capability of ending a user's call in connection, if necessary. According to an embodiment, entities are capable of allowing messages to update Quality of Service (QoS). To this end, entities are capable of transmitting barring information regarding UE connected as in the following description; wherein the barring information may be configured based on a white list including allowed information.

Referring to FIG. 2, the base station (eNB) 230 is capable of broadcasting information 290 regarding IMS-related barring for the connected UE, or IMS-related barring for the connected UE. The connected UE devices 210 receive the IMS-related barring information 290. The connected UE devices 210 are capable of identifying the received information before transmitting IMS related messages. The UE devices 210 are capable of determining whether they transmit a message to use IMS, based on the received information. When UE devices are not barred, they are capable of transmitting an IMS-related message. When UE devices are barred, they may wait, not transmitting a message to use IMS, according to conditions.

An example of the IMS-related barring information 290 is as in the following table 1.

TABLE 1

IMS related Barring for connected UE {Allowed Service = (emergency call, MMTel voice, Instant message), IMS service barring = {ac-BarringFactor, ac-BarringTime, ac-BarringForSpecialAC}}

In table 1, Allowed Service may include information regarding a list of services indicating that IMS is allowed, without barring IMS. For example, on a list of allowed services, an emergency call or Multi-Media Telephony (MMTel) voice may be marked as an allowed service. On the list of allowed services, an instant messaging service as an allowed service may be marked.

As described in table 1, according to an embodiment, the IMS-related barring information 290 regarding UE in connected mode may include a barring factor, BarringFactor. The barring factor is compared with a random value created by UE, and may be used to determine whether to bar the UE, according to the comparison result.

According to an embodiment, the IMS-related barring information 290 regarding UE in connected mode may include information regarding a barring time, BarringTime. UE is capable of calculating a period of time to be barred, based on the barring time.

According to an embodiment, the IMS-related barring information 290 regarding UE in connected mode may include information, ac-BarringForSpecialAC, indicating a condition as to whether to allow a priority user to access services. For example, when a UE class stored in a USIIM of UE belongs to a class including BarringForSpecialAC where applying barring is not marked, the UE may transmit a message to use IMS, without calculating a barring application.

Hereinafter, a detailed description is provided regarding a method of barring UE in connected mode using IMS-related barring information 290 regarding UE in connected mode.

Referring to FIG. 3 showing an embodiment of a method of barring UE in connected mode, UE devices are capable of receiving, from the eNB, information for controlling transmission of IMS-related messages of UE in connected mode, before transmitting IMS messages to use IMS, in operation 310. For example, UE may obtain IMS-related barring information 290 regarding UE in connected mode, included in system information broadcast from an eNB, before transmitting IMS messages. After that, UE reads the IMS-related barring information 290 to control transmission of IMS-related messages, and transmits the information 290 to an IMS stack.

When the UE in connected mode needs to transmit an IMS message to use IMS in operation 320, the IMS stack is capable of identifying the transmitted, IMS-related barring information 290 regarding UE in connected mode in operation 330.

According to an embodiment, the IMS stack is capable of determining whether the IMS to be used is included in a list of allowed services in operation 340. When the IMS that UE intends to use is included in a list of allowed services in operation 340, the UE is capable of transmitting IMS messages for using a corresponding service regardless of the IMS-related barring information 290 regarding UE in connected mode in operation 350. On the contrary, when the IMS that UE intends to use is not included in a list of allowed services in operation 340, the UE is capable of applying the IMS-related barring information 290 regarding UE in connected mode as in the following operation 360.

For example, an emergency call or Multi-Media Telephony (MMTel) voice as an allowed service may be marked on the list of allowed services. When the IMS that the UE intends to use is an emergency call or Multi-Media Telephony (MMTel) voice, the UE is capable of transmitting an IMS message to use the IMS, regardless of the IMS-related barring information 290 regarding UE in connected mode in operation 350. On the contrary, when the IMS that the UE intends to use is not an emergency call or Multi-Media Telephony (MMTel) voice, but a service, e.g., a service for registering new IMS, an instant messaging service, etc., which is not included in the list of allowed services, the UE is capable of applying the IMS-related barring information 290 regarding UE in connected mode as in the following operation 360.

According to an embodiment, when applying the IMS-related barring information 290 in operation 360, the UE is capable of first checking information indicating a condition as to whether to allow a priority user in the IMS-related barring information 290 to access services. The information indicating a condition as to whether to allow a priority user to access services may be information regarding the IMS-related barring information 290, ac-BarringForSpecialAC. The ac-BarringForSpecialAC may be information indicating a condition as to whether IMS barring is applied to classes 11, 12, 13, 14, and 15 for the priority user. When a UE class stored in a USIIM of UE belongs to a class including BarringForSpecialAC where applying barring is not marked, the UE may transmit a message to use IMS, without calculating a barring application in operation 350.

On the contrary, when UE belongs to a class where applying barring is marked, based on the result of checking BarringForSpecialAC, the UE may calculate a barring application in operation 370. In order to calculate a barring application, the UE creates a random value and compares the random value with a barring factor, BarringFactor, included in the IMS-related barring information 290. When the random value is less than the barring factor, the UE is capable of transmitting a message to use IMS, without the barring application, in operation 350.

On the contrary, when the random value is greater than the barring factor, the UE needs to be applied in barring, and may thus calculate a period of time to be applied in barring, based on the barring time included in the received, IMS-related barring information 290, for example, in operation 380. After that, the UE may wait for the calculated period of time to be barred, without creating a signal to use IMS.

According to embodiment, UE has already transmitted an INVITE message for MMTel voice/video services and may have the active session. In this case, UE devices having an active session may proceed with corresponding processes without the influence of barring application. Alternatively, the ongoing MMTel voice and ongoing MMTel video may be included in the list of allowed services contained in the IMS-related barring information 290. In this case, UE devices that have already transmitted an INVITE message and had an active session are capable of proceeding with corresponding processes without the influenced of barring.

Figure 4:
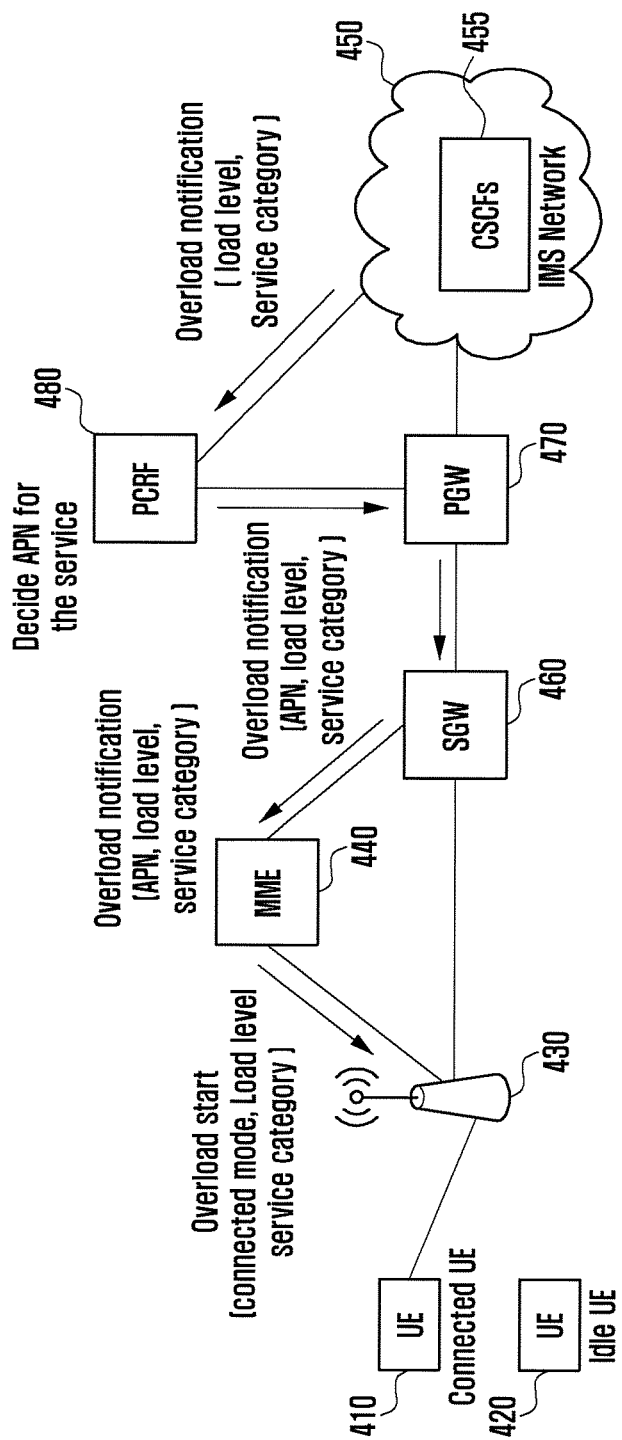
FIGS. 4 and 5 are diagrams illustrating a method of transmitting an overload control message according to an embodiment of the present invention.
Figure 5:
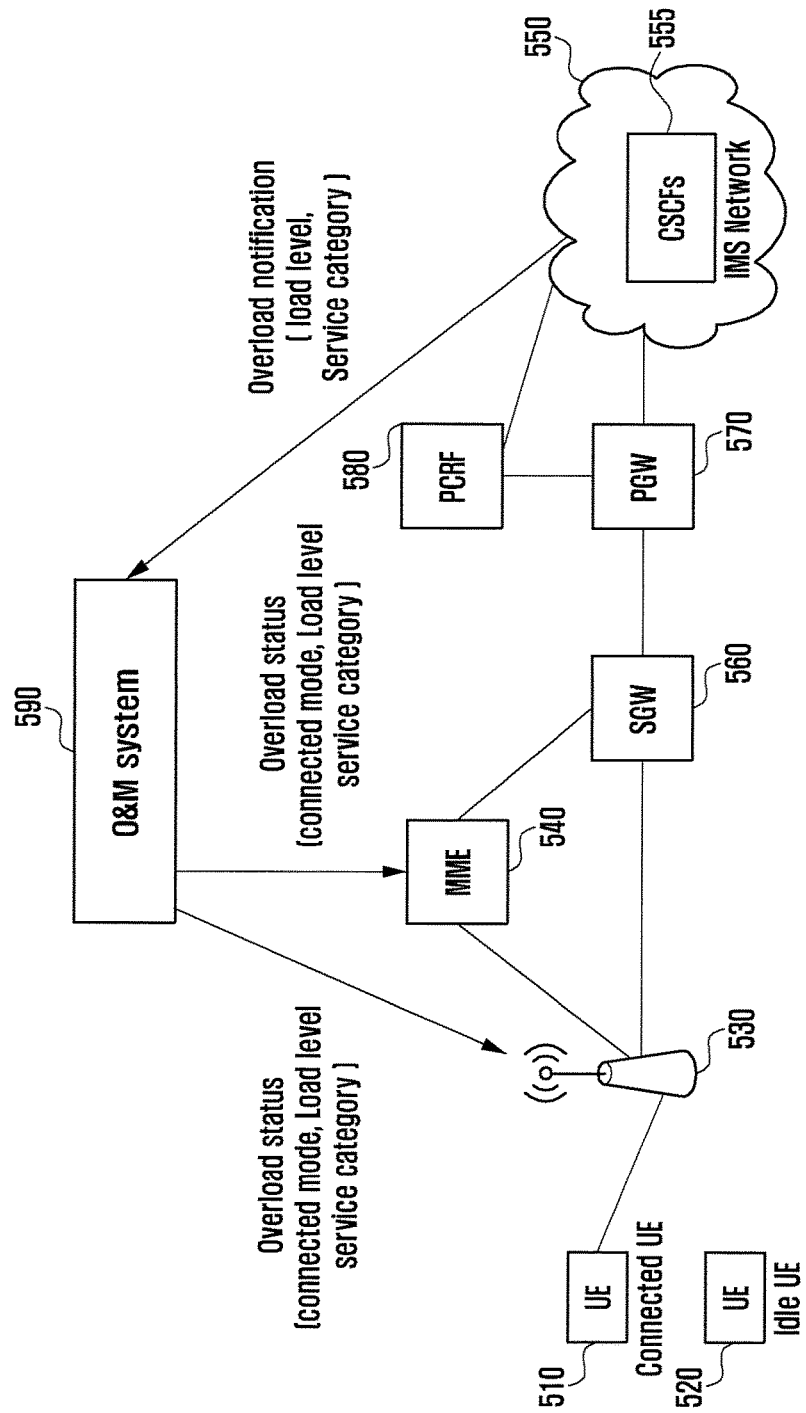

FIGS. 4 and 5 are diagrams illustrating a method of transmitting an overload control message according to an embodiment of the present invention.

Referring to FIG. 4, the load status of IMS entities that trigger to broadcast the barring information regarding IMS may be transmitted by using a control plane.

When the control plane signaling is used for transmission of a load status of the IMS entity 450, an IMS entity (e.g., Proxy-Call Session Control Function (P-CSCF) 455) having a connection node with Policy and Charging Rules Function (PCRF) 480, from among the IMS entity 450, may notify the PCRF 480 of the overload status information. The overload status information may include a load level indicating the degree of load upon the IMS entity. The overload status information may also include a service category indicating information regarding which services are allowably accessible.

According to an embodiment, the IMS entity 450 is capable of including the overload status information as additional information in messages on the Rx interface and transmitting the messages to the PCRF 480. The IMS entity 450 is also capable of transmitting, to the PCRF 480, the overload status information via a separate load status notification message, Load Status Notification. When the load status information of the IMS entity 450 as additional information is included in the message to be transmitted to the PCRF 480, the message on the Rx interface may be, for example, session termination request/response, abort session request/answer, etc.

When the PCRF 480 receives the load status information from the IMS entity 450, via an additional load status notification message or an existing Rx message with an additional IE, it may forward the load status information to the Packet Data Network Gateway (PGW) 470. In this case, the PCRF 480 is capable of including Access Point Name (APN) to the load status information of the IMS entity and transmitting the load status information to the PGW 470. According to an embodiment, the PCRF 480 is also capable of adding the load status information regarding the IMS entity to a message related to the Internet Protocol Connectivity Access Network (IP CAN) session on the Gx interface and transmitting the message to the PGW 470.

The PGW 470 is capable of including the received information in a message, GPRS Tunneling Protocol Control (GTP-C), and transmitting the message to the MME 440. The GTP-C message is exchanged between the PGW 470 and MME 440.

The MME 440 is capable of determining whether it controls the load upon connected UE devices and setting the number of eNBs to which it will transmit command for controlling load, based on the received, load level and configured information. The MME 440 is capable of transmitting, to part or all of the set number of eNBs 430, the load level, service category, etc., along with a message instructing to apply the overload control to UE in connected mode.

The eNB 430 is capable of creating the IMS-related barring information 290 regarding UE in connected mode, as shown in FIG. 2, by using the received load level and the service category. The eNB 430 is capable of broadcasting the created IMS-related barring information 290 regarding UE in connected mode. According to an embodiment, the barring information may be configured in such a way as to set the level of barring factor by using the load level. For example, when the load level is high, the level of barring factor is set to be high. The service category may be set, referring to service information transmitted from the CSCF.

Although the embodiment of FIG. 4 describes transmission of a load status of an IMS entity by control plane signaling, it should be understood that the present invention is not limited thereto. For example, as shown in FIG. 5, the load status information regarding an IMS entity may also be transmitted by an additional network entity such as Operation and Management (O&M) system 590.

Referring to FIG. 5, the IMS entity 550 is capable of notifying the O&M system 590 of the overload status information regarding an IMS entity. Since the overload status information was described above referring to FIG. 4, its detailed description is omitted below.

The O&M system 590 is capable of receiving the overload status information from the IMS entity 550 and transmitting the load level, category service, etc. to the MME 540 or eNB 530. Since the operations after the MME 540 or eNB 530 receives the overload status information were describe above referring to FIG. 4, its detailed description is omitted.

Figure 6:
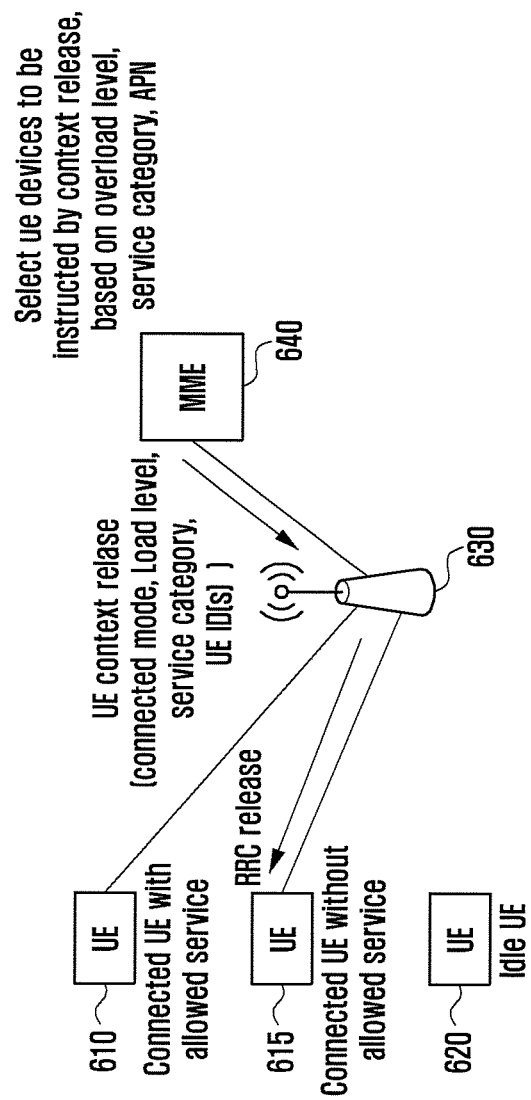
FIG. 6 is a diagram illustrating a method of barring UE in connected mode according to a second embodiment of the present invention.
Figure 7:
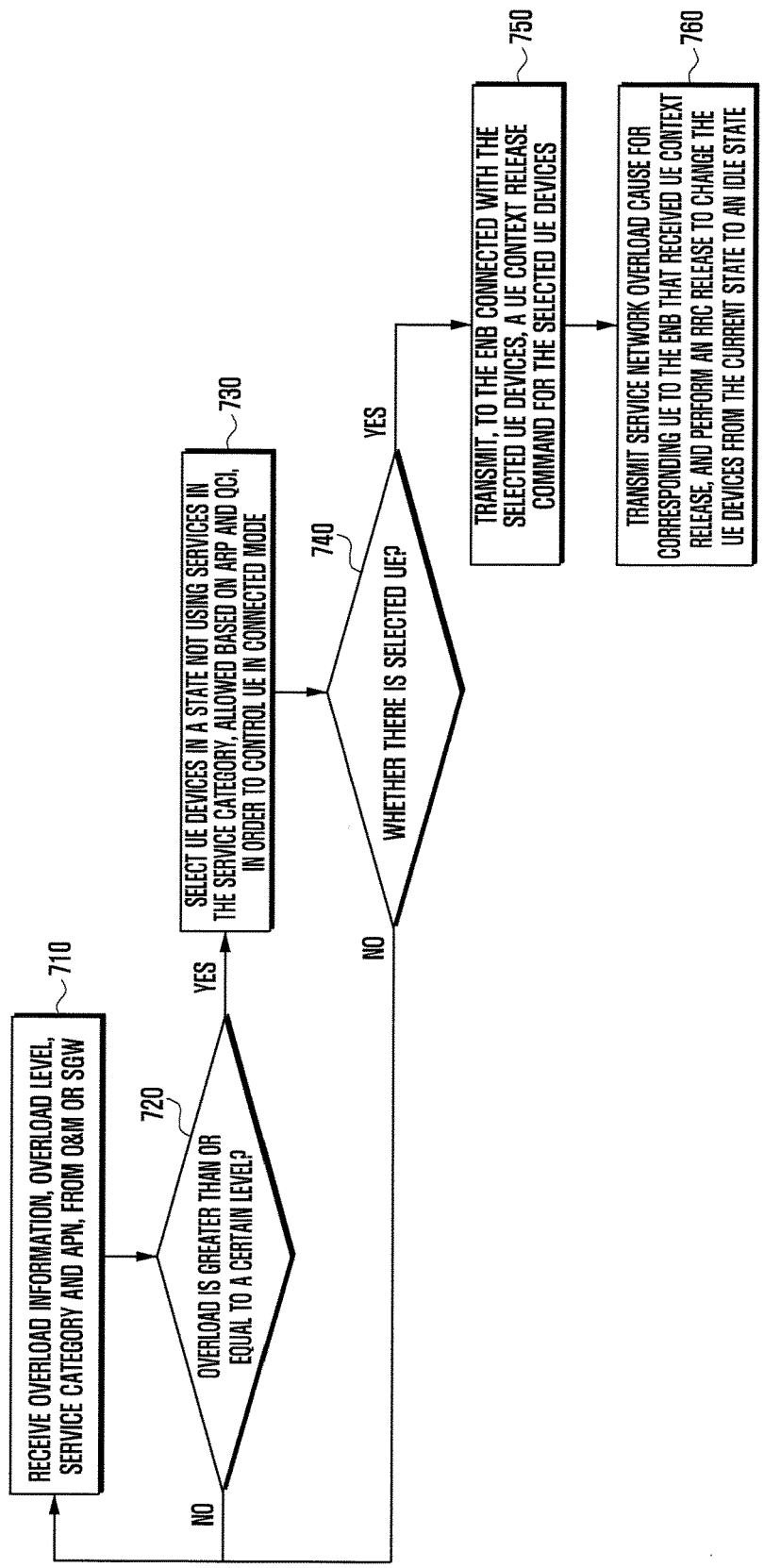
FIG. 7 is a flow diagram describing a method of barring UE in connected mode according to a second embodiment of the present invention.

FIG. 6 is a diagram illustrating a method of barring UE in connected mode according to a second embodiment of the present invention, and FIG. 7 is a flow diagram describing a method of barring UE in connected mode according to a second embodiment of the present invention.

Referring to FIG. 6, as described above referring to FIG. 4 or 5, the IMS overload status information is transmitted to the MME 640 through control plane signaling or by an Operation and Management (O&M) system.

The MME 640 is capable of selecting UE devices 615 in a state not using allowed services, based on Allocation and Retention Priority (ARP) and QoS Class Identifier (QCI). The MME 640 is capable of creating a UE context release command for changing UE devices 615 from in a state not using allowed services, based on ARP and QCI, to in an idle state, and transmitting the command to the eNB 630.

In the embodiment that selects UE devices in a state not using allowed services, based on ARP and QCI, when a setting is made to allow all services of priority service users, UE devices established with bearers with ARP corresponding to priority service users may be excluded from the selection. When a setting is made to allow an emergency call service, UE devices established with bearers with emergency ARP may also be excluded from the selection. When a setting is made to allow all services of an ongoing MMTel voice call, UE devices established with bearers with QCI=1 may be excluded from the selection.

According to an embodiment, when the MME 640 transmits a UE context release command to an eNB 630 to which UE devices 615, selected as UE devices in a state not using allowed services, are connected, it is capable of transmitting messages to UE devices 615 respectively. According to an embodiment, the MME 640 may also transmit, to the eNB 630 to which it will transmit the message, a command including identifiers corresponding UE devices connected to the eNB 630, thereby requesting UE context release from the eNB 630.

When receiving the UE context release command, the eNB 630 performs an RRC release operation. In performing the RRC release operation, the eNB 630 may transmit a Service Network Overload Indicator to the UE 615 to inform the release cause. In this process, the eNB 630 may also assign a backoff value to the UE 615, thereby controlling the network access.

UE devices 615 that have been changed into an idle state may read existing barring information applied to an idle mode from the eNB, and thus determine whether they access a network. For example, UE 615 may read existing barring information included in the system information to determine whether it accesses a network. When UE ascertains that it is not allowed access to a network, it may maintain the idle mode without requesting access.

According to an embodiment, along with a mechanism for UE in connected mode, in addition to the existing barring information, parameters, similar to the IMS-related barring information 290 regarding UE in connected mode described above referring to FIG. 2, may be set to different values for idle mode. For example, information regarding IMS-related Barring for idle mode, including Allowed Service, IMS service barring information, etc., may be set in order to be applied to UE devices in idle mode. After that, the eNB 630 is capable of broadcasting the information, along with information regarding IMS-related Barring for connected mode as the IMS-related barring information regarding UE in connected mode, thereby controlling access to the IMS.

Referring to FIG. 7 showing a method for MME 640 to transmit a UE context release command, the MME 640 is capable of receiving the IMS overload status information from a Serving Gateway (SGW) or Operation and Management (O&M) through control plane signaling in operation 710. The IMS overload status information may include at least one of the following: a load level indicating the degree of load upon an IMS entity, a service category indicating information regarding which services are allowably accessible, and APN.

The MME 640 is capable of determining whether the overload upon an IMS entity is greater than or equal to a certain level, based on the received information, in operation 720. When the MME 640 ascertains that the overload upon an IMS entity is less than a certain level in operation 720, it returns to operation 710.

On the other hand, when the MME 640 ascertains that the overload upon an IMS entity is greater than or equal to a certain level in operation 720, it is capable of selecting UE devices in a state not using services allowed based on ARP and QCI in order to control UE in connected mode in operation 730. The MME 640 is capable of selecting UE devices that do not use services in the service category included in the information received as in operation 710. Since this was described in detail above, its description is omitted below.

After that, the MME 640 determines whether UE that does not use allowed services is selected in operation 740. When the MME 640 ascertains that UE that does not use allowed services has not been selected in operation 740, it returns to operation 710.

On the other hand, when the MME 640 ascertains that UE that does not use allowed services has been selected in operation 740, it is capable of transmitting, to the eNB 630 connected with the selected UE devices 615, a UE context release command for the selected LIE devices 615 in operation 750. Since this was described in detail above, its description is omitted below.

When receiving the UE context release command, the eNB 630 performs an RRC release for the UE devices 615 and changes the UE devices 615 from the current state to an idle state in operation 760. In performing an RRC release, the eNB 630 may transmit a Service Network Overload Indicator to the UE 615 to inform the release cause.

Figure 8:
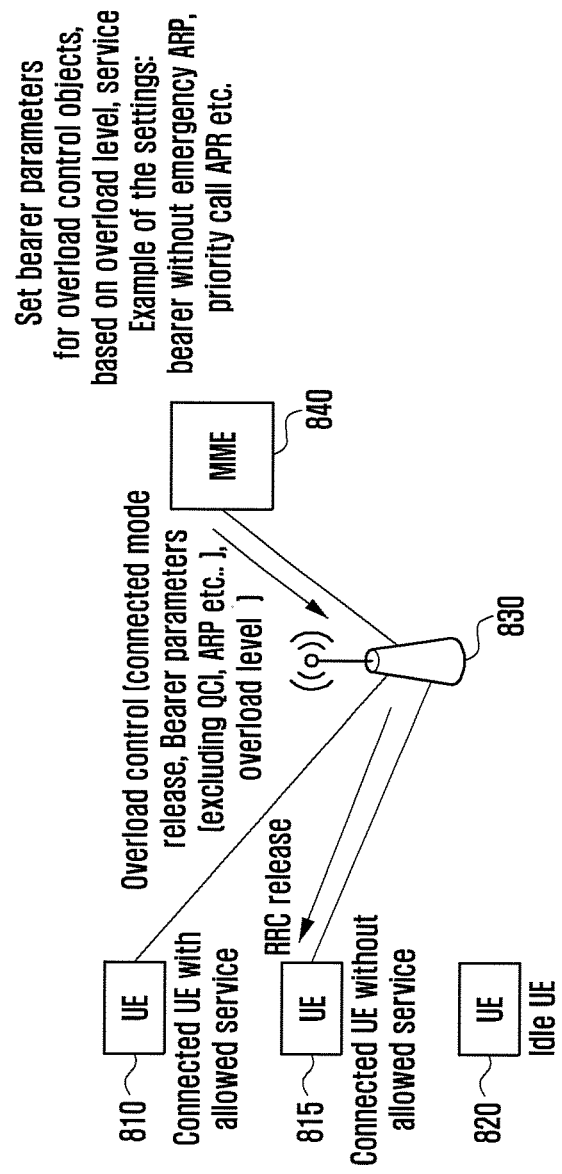
FIG. 8 is a diagram illustrating a method of barring UE in connected mode according to a third embodiment of the present invention.
Figure 9:
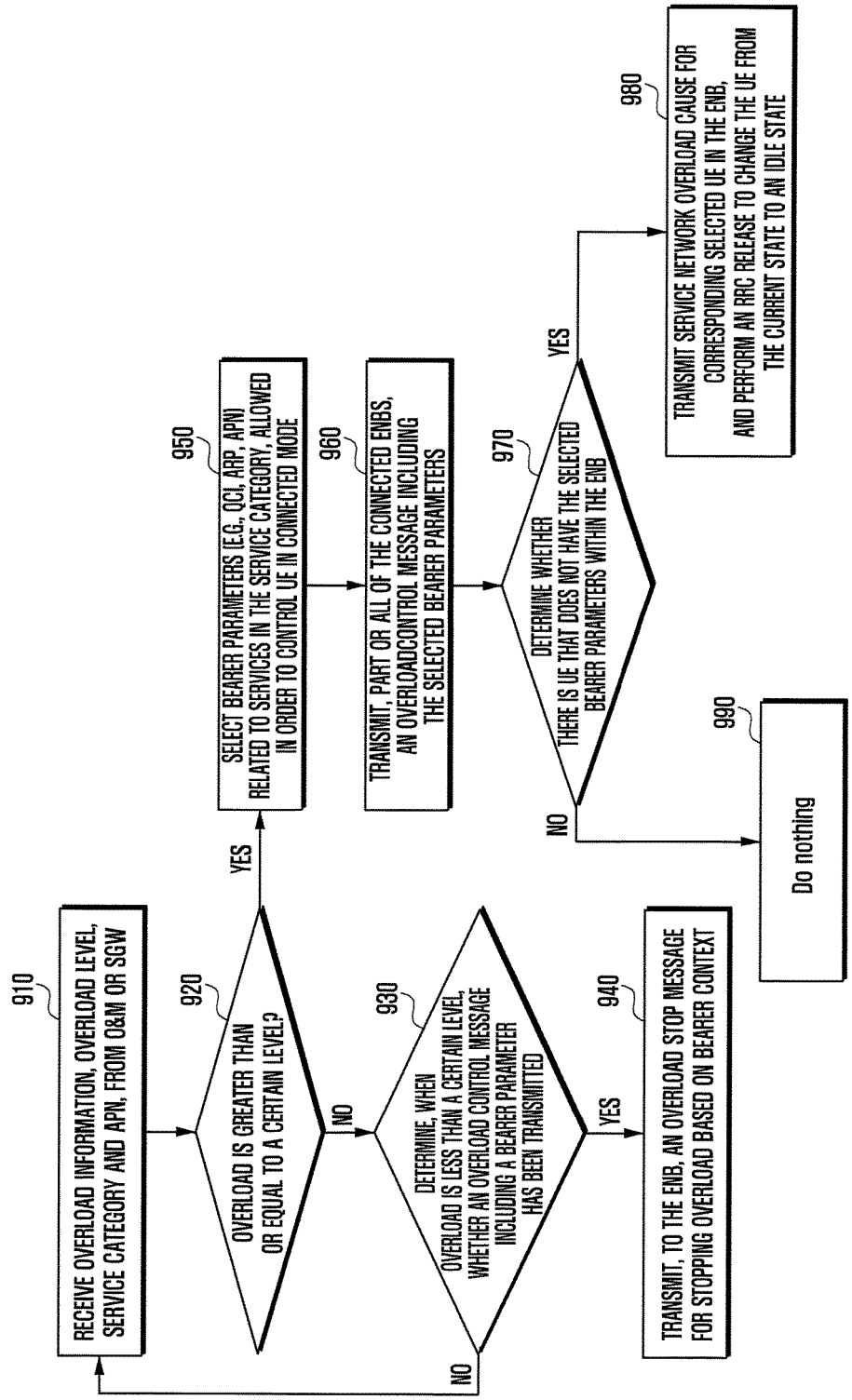
FIG. 9 is a flow diagram describing a method of barring UE in connected mode according to a third embodiment of the present invention.

FIG. 8 is a diagram illustrating a method of barring UE in connected mode according to a third embodiment of the present invention, and FIG. 9 is a flow diagram describing a method of barring UE in connected mode according to a third embodiment of the present invention.

Referring to FIG. 8, as described above referring to FIG. 4 or 5, the IMS overload status information is transmitted to the MME 840 through control plane signaling or by an Operation and Management (O&M) system.

After that, the MME 840 is capable of configuring bearer parameters for allowed services, based on Allocation and Retention Priority (ARP) and QoS Class Identifier (QCI). The MME 840 includes the configured bearer parameters in an overload control message and transmits the overload control message to part or all of the eNBs 830 connected to the MME 840.

When the eNB 830 receives the overload control message with the bearer parameter values, it is capable of determining whether there are UE devices that do not have a bearer parameter corresponding to an overload level in the received overload control message. When the eNB 830 ascertains that there are UE devices that do not have a bearer parameter corresponding to an overload level in the received overload control message, it is capable of selecting part of all of the UE devices and performing an RRC release operation for the selected UE.

In performing the RRC release operation, the eNB 830 may transmit a Service Network Overload Indicator to the UE 815 to inform the release cause. In this process, the eNB 830 may also assign a backoff value to the UE 615, thereby controlling the network access.

According to an embodiment, after transmitting the overload control message to the eNB 830, the MME 840 may determine whether the overload is less than or equal to a certain level. The MME 840 may determine whether the overload is less than or equal to a certain level, based on information received from SGW or O&M, such as APN, an overload level, a service category, etc.

According to the determination, the MME 840 is capable of transmitting information indicating that the overload has been resolved to the eNBs 830 that transmitted the bearer context-based overload control message. According to an embodiment, notifying that the overload has been resolved may be performed in such a way that an overload control strop message as a separate message is transmitted or an existing overload control message sets the bearer parameter to null and then is transmitted.

The eNB 830 receives the notification informing that the overload has been resolved and stops releasing UE in connected mode.

UE 815 in an idle state: receives MMTel voice and video barring information and access class barring information that the eNB 830 transmits to UE devices in idle mode; and determines whether it accesses to a network.

In order to bar UE in idle mode from IMS services, the system may set parameters, similar to the IMS-related barring information 290 regarding UE in connected mode described above referring to FIG. 2, to different values for idle mode, and may use the parameters. For example, the system may set information regarding IMS-related Barring for idle mode, including Allowed Service, IMS service barring information, etc., to apply the set information to UE devices in idle mode. The eNB 830 may broadcast the information along with information regarding the IMS-related Barring for connected mode, as the IMS-related barring information regarding UE in connected mode, thereby controlling access to the IMS.

Referring to FIG. 9 showing a method for MME 840 to transmit bearer parameters for allowed services, the MME 840 is capable of receiving the IMS overload status information from a Serving Gateway (SGW) or Operation and Management (O&M) through control plane signaling in operation 910. The IMS overload status information may include at least one of the following: a load level indicating the degree of load upon an IMS entity, a service category indicating information regarding which services are allowably accessible, and APN.

After that, the MME 840 is capable of determining whether the overload upon an IMS entity is greater than or equal to a certain level, based on the received information, in operation 920.

When the MME 840 ascertains that the overload upon an IMS entity is greater than or equal to a certain level in operation 920, it may select bearer parameters related to allowed services to control UE in connected mode in operation 950. The MME 840 may select bearer parameters related to services in the service category included in the information received as in operation 910. Since this was described in detail above, its description is omitted below.

The MME 840 is capable of transmitting an overload control message including bearer parameters to part or all of the connected eNBs 830 in operation 960.

The eNB 830 is capable of determining whether there is UE 815 that does not has a bearer parameter included in the received overload control message in operation 970. When there is not UE that does not has a bearer parameter from among the UE devices within the eNB 830 in operation 970, the eNB 830 does not perform a release or disconnection process in operation 990.

On the other hand, when there is UE 815 that does not has a bearer parameter from among the UE devices within the eNB 830 in operation 970, the eNB 830 performs an RRC release for the UE 815 to change the UE 815 from the current state to an idle state in operation 980. In this process, the eNB 830 may transmit a Service Network Overload Indicator to the UE 815 to inform the release cause.

Meanwhile, when the MME 840 ascertains that the overload upon an IMS entity is less than a certain level in operation 920, it is capable of determining whether it has transmitted an overload control message including a bearer parameter to the eNB 830 in operation 930. When the MME 840 has not transmitted an overload control message to the eNB 830 in operation 930, it returns to operation 910.

On the other hand, when the MME 840 has transmitted an overload control message to the eNB 830 in operation 930, since it has already performed the RRC release process for the UE without the bearer parameter, it may transmit, to the eNB 830, information notifying that the overload has been resolved in operation 940. Since this was described in detail above, its description is omitted below.

Figure 10:
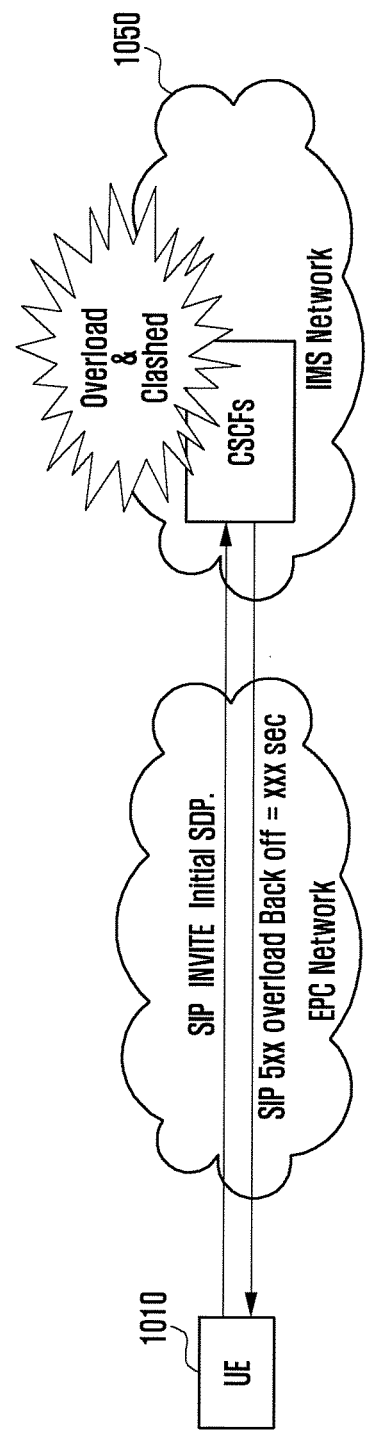
FIG. 10 is a diagram illustrating a method of barring UE in connected mode according to a fourth embodiment of the present invention.

FIG. 10 is a diagram illustrating a method of barring UE in connected mode according to a fourth embodiment of the present invention.

Referring to FIG. 10, in a state where the load upon the IMS entity 1050 is greater than or equal to a certain level, when the IMS entity 1050 receives a service request message, such as INVITE, etc., from the UE 1010, it inserts a backoff value and a code indicating an overload state into the header and transmits the message to the UE 1010. When receiving the backoff value and the code indicating an overload state, the UE 1010 may not transmit the requested service for the backoff period of time. That is, the IMS entity 1050 is capable of distinguishing between services requested by the UE 1010. The IMS entity 1050 is capable of determining whether access to the requested service is allowed.

In the embodiments shown in FIGS. 4 to 9, the IMS entity is capable of transmitting the overload status related information to MME, etc., and the IMS overload status information may include information regarding which services are allowably accessible. Meanwhile, in the embodiment shown in FIG. 10, instead of transmitting the overload status information to MME, etc., the IMS entity 1050 is capable of determining which services are allowably accessible and baring the services requested by the UE 1010 according to the load state of the IMS entity 1050. For example, when the UE 1010 transmits, to the IMS entity 1050, a message, INVITE, to initiate a Voice over Long Term Evolution (VoLTE) call, the IMS entity 1050 is capable of determining whether to bar or allow the VoLTE service. When the IMS entity 1050 determines to bar the VoLTE service, it is capable of transmitting, to the UE 1010, a message including information indicating that access of the UE 1010 is barred. According to an embodiment, the IMS entity 1050 may transmit, to the UE 1010, a backoff value along with the information.

According to an embodiment, the back off and the overload status code used for the response message may be set as in the following table 2.

TABLE 2

SIP/2.0 5xx Server overload Via: SIP/2.0/UDP
pcscf2.home2.net:5088;comp=sigcomp;branch=z9hG4bK876t12.1, SIP/2.0/UDP
scscf2.home2.net;branch=z9hG4bK764z87.1, SIP/2.0/UDP icscf2_s.home2.net;branch=z9hG4bK871y12.1,
SIP/2.0/UDPscscf1.home1.net;branch=z9hG4bK332b23.1, SIP/2.0/UDP
pcscf1.home1.net;branch=z9hG4bK431h23.1, SIP/2.0/UDP
[5555::aaa:bbb:ccc:ddd]:1357;comp=sigcomp;branch=z9hG4bKnashds7
Record-Route: <sip:pcscf2.home2.net:5088;lr;comp=sigcomp>, <sip:scscf2.home2.net;lr>,
<sip:scscf1.home1.net;lr>, <sip:pcscf1.home1.net;lr>
P-Access-Network-Info: 3GPP-UTRAN-TDD; utran-cell-id-3gpp=234151D0FCE11
Privacy: none Back-off: 500From: To: <tel:+1-212-555-2222>;tag=314159 Call-ID:
CSeq: RSeq: 9021 Content-Type: application/sdp Content-Length: (...)

Figure 11:
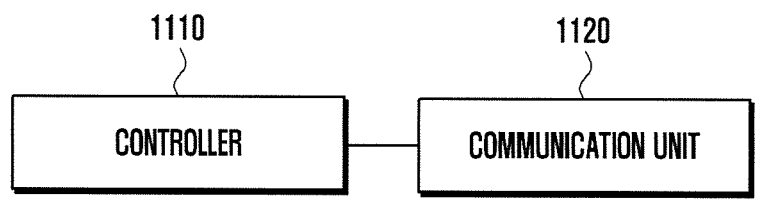
FIG. 11 is a block diagram of UE according to an embodiment of the present invention.

FIG. 11 is a block diagram of UE according to an embodiment of the present invention.

Referring to FIG. 11, the controller 1110 controls UE to perform operations related to one of the embodiments described above. For example, the controller 1110 receives IMS entity load information from the IMS entity, and controls the UE to stop transmitting the IMS service request message for a pre-set period of time, by using the IMS entity load information.

The communication unit 1120 is capable of transmission/reception of signals according to operations to perform one of the embodiments described above. For example, the communication unit 1120 is capable of receiving the IMS entity load information from the IMS entity of an RRC disconnection message from an eNB.

Figure 12:
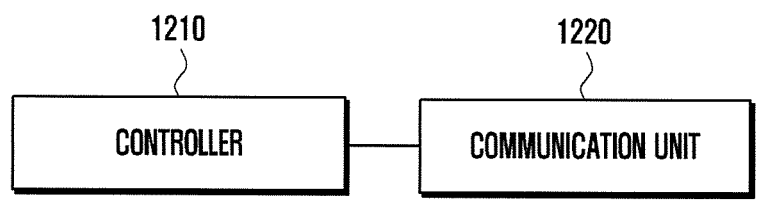
FIG. 12 is a block diagram of an eNB according to an embodiment of the present invention.

FIG. 12 is a block diagram of an eNB according to an embodiment of the present invention.

Referring to FIG. 12, the controller 1210 controls the eNB to perform operations related to one of the embodiments describe above. For example, the controller 1210 receives, from the MME, IMS-related barring information regarding UE devices connected to the eNB, and controls the disconnection of the UE from the eNB, by using the received, IMS-related barring information.

The communication unit 1220 is capable of transmission/reception of signals according to operations to perform one of the embodiments described above. For example, the communication unit 1220 is capable of receiving, from MME, IMS-related barring information regarding UE devices connected to the eNB.

Figure 13:
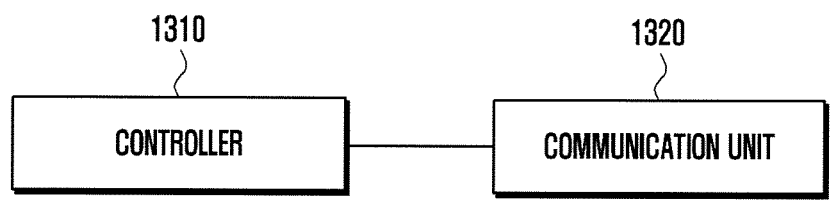
FIG. 13 is a block diagram of MME according to an embodiment of the present invention.

FIG. 13 is a block diagram of MME according to an embodiment of the present invention.

Referring to FIG. 13, the controller 1310 controls the MME to perform operations related to one of the embodiments describe above. For example, the controller 1310 receives, from the IMS entity, the IMS entity load information, and controls the MME to transmit, to the eNB, the IMS-related barring information regarding UE devices connected to the eNB.

The communication unit 1320 is capable of transmission/reception of signals according to operations to perform one of the embodiments described above. For example, the communication unit 1320 is capable of receiving, from the IMS entity, the IMS entity load information, and transmitting, to the eNB, the IMS-related barring information regarding UE devices connected to the eNB.

Although it is not shown in the drawings, the IMS entity according to an embodiment is capable of including a controller and a communication unit. The controller controls the IMS entity to perform operations related to one of the embodiments describe above. The communication unit is capable of transmission/reception of signals according to operations to perform one of the embodiments described above. For example, the communication unit is capable of receiving a service request message from UE. The controller is capable of determining whether to allow the UE to access the requested services or to bar the UE from the requested services and transmitting the response message to the UE.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

It should be understood that the detailed description is not to be analyzed to limit the present invention but is to show examples. Accordingly, the scope of the invention is not to be limited to the particular invention embodiments above, but should be defined only by the claims set forth below and equivalents thereof.

The invention claimed is:

1. A method by a mobility management entity (MME) comprising:
   obtaining information on a load status of an internet protocol multimedia service (IMS) entity;
   identifying, based on the information on the load status of the IMS entity, whether an overload state of the IMS entity exceed a predetermined level;
   if the overload state of the IMS entity exceeds the predetermined level, transmitting, from the MME to a base station, a first control message for controlling connection release of at least one terminal, the first control message including information on a bearer corresponding to an allowed service based on an allocation and retention priority (ARP) or QoS class identifier (QCI); and
   if the overload state of the IMS entity does not exceeds the predetermined level, transmitting, from the MME to the base station, a second control message for notifying that an overload has been resolved.

2. The method of claim 1, wherein transmitting of the first message comprises:
   identifying the at least one terminal which does not use the allowed service based on the information on the bearer corresponding to the allowed service; and
   transmitting the first message including a UE context release command for the at least one terminal.

3. The method of claim 1, wherein the second control message is transmitted to the base station if the first control message including the information on the bearer corresponding to the allowed service has been transmitted to the base station previously.

4. A mobility management entity (MME) comprising:
   a transceiver; and
   a controller connected with the transceiver and configured to control to:
   obtain information on a load status of an internet protocol multimedia service (IMS) entity,
   identify, based on the information on the load status of the IMS entity, whether an overload state of the IMS entity exceed a predetermined level,
   if the overload state of the IMS entity exceeds the predetermined level, transmit, from the MME to a base station, a first control message for controlling connection release of at least one terminal, the first control message including information on a bearer corresponding to an allowed service based on an allocation and retention priority (ARP) or QoS class identifier (QCI), and
   if the overload state of the IMS entity does not exceeds the predetermined level, transmit, from the MME to the base station, a second control message for notifying that an overload has been resolved.

5. The entity of claim 4, wherein the controller is configured to control to:
   identify the at least one terminal which does not use the allowed service based on the information on the bearer corresponding to the allowed service; and transmit the first message including a UE context release command for the at least one terminal.

6. The entity of claim 4, wherein the second control message is transmitted to the base station if the first control message including the information on the bearer corresponding to the allowed service has been transmitted to the base station previously.

* * * * *